Dec. 17, 1963  D. F. JUDD  3,114,414
NUCLEAR VAPOR GENERATING APPARATUS
Filed Feb. 14, 1958  2 Sheets-Sheet 2
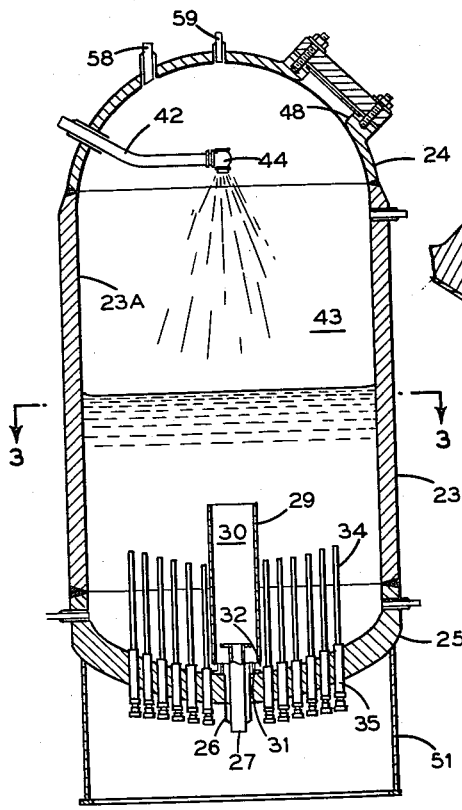
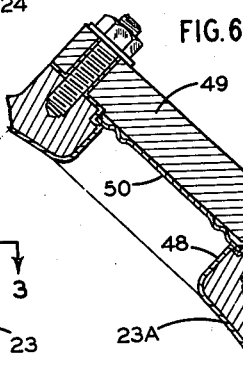
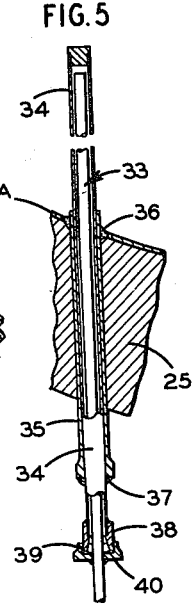
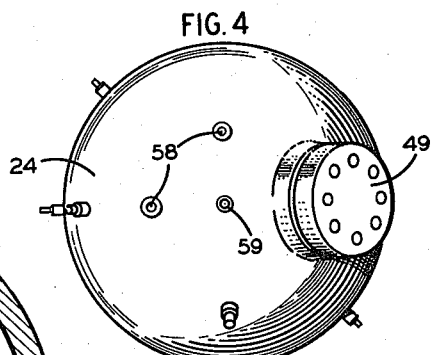
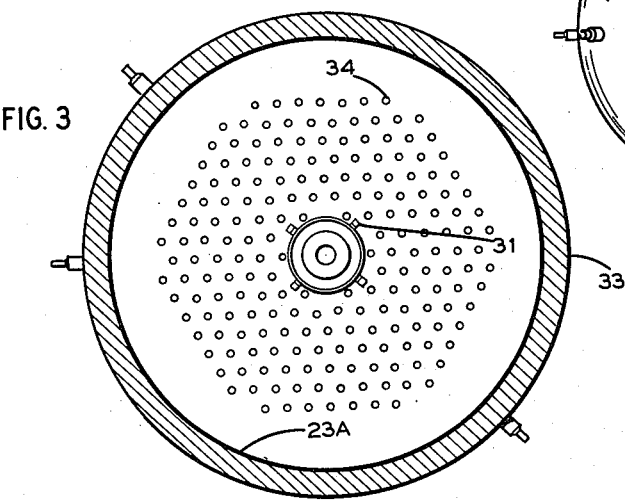
INVENTOR.
Donald F. Judd
BY
ATTORNEY United States Patent Office 3,114,414
Patented Dec. 17, 1963

3,114,414
NUCLEAR VAPOR GENERATING APPARATUS
Donald F. Judd, Marietta, Ga., assignor to The Babcock & Wilcox Company, New York, N.Y., a corporation of New Jersey
Filed Feb. 14, 1958, Ser. No. 715,432
9 Claims. (Cl. 165—31)

This invention relates to a nuclear vapor generating apparatus and more particularly to a pressurizing system for use in a pressurized water, nuclear steam generator. The pressurizer system in accordance with this invention comprises essentially of a pressurizer vessel, heaters, surge line, spray line and spray head; its function being to establish and maintain the nuclear generator's primary coolant system pressure within predetermined limits during warmup, steady state operation, load changes and shut down; to temporarily contain an insurge of the primary coolant as its density decreases; and to provide temporary make-up as the density of the primary coolant increases.

An object of this invention is to provide in a pressurizer system of a nuclear generator, a vertically elongated vessel or tank having curvilinear upper and lower head end portions and in which a plurality of vertically elongated heaters are extended upwardly through the curvilinear bottom head end and into the bottom portion of the vessel.

Another object is to provide the pressurizer vessel with a combined insurge-outsurge nozzle means disposed in the bottom head and about which there is disposed a baffle means to form a chamber for normally containing the insurging and outsurging coolant out of contact of the heaters.

Another object of this invention is to provide for cleaning the pressurizer vessel of any radioactive impurities which would tend to accumulate therein without the necessity of draining the pressurizer, the water volume contained therein providing a radiation shield during cleaning.

In accordance with this invention the pressurizer system which is referred to as the System, comprises a pressurizer vessel that is vertically installed and normally contains a body of saturated water in the lower portion and saturated steam in the upper portion thereof. This water provides a reserve for sudden increases in the density of the coolant in the primary system and the steam provides a cushion and surge volume for sudden decreases in density of the coolant. Heater means are projected upwardly through the bottom head end of the vessel to heat the System on startup and to generate and maintain the steam head necessary to maintain the primary coolant system at normal operating pressure. A combined insurge-outsurge means disposed in the bottom of the pressurizer connects the vessel to the hot outlet of a nuclear reactor; the surge means carrying the water between the primary coolant system and the pressurizer system when there is a change in the density of the coolant. A baffle means forming a chamber is disposed about the insurge-outsurge means within the vessel to normally contain the insurging coolant.

A spray line penetrates the upper steam portion of the vessel and is connected at its other end to the reactor's cold inlet. In accordance with this invention the spray line is equipped with a control valve designed to pass a quantity of water, either intermittently and/or continuously, through a spray head for retarding pressure rise on an insurge during normal operation and for reducing pressure on shut down. The spray line is also equipped with a restricted orifice to limit the flow through the spray line in the event the control valve sticks in the open position. A pressure controller means responsive to the pressure within the vessel is provided to co-ordinate the actuation of the spray control valve and heaters to maintain the pressure of the coolant system within the predetermined limits.

A feature of this invention resides in the arrangement of the baffle means forming a chamber which is centered about the insurge-outsurge nozzle for containing the relatively cool insurging coolant of the primary coolant system.

Other allied features and advantages will be readily apparent when considered in view of the drawings and specification in which:

FIG. 2 is a vertical sectional view of the pressurizer vessel in accordance with this invention.

FIG. 3 is a sectional plan view taken along line 3—3 of FIG. 2.

FIG. 4 is a showing of the top end view of the pressurizer vessel.

FIG. 5 is an enlarged detail sectional view taken vertically through one of the heater means.

FIG. 6 is an enlarged detail view of the manway closure by which access is had to the vessel internals.

FIG. 7 is an enlarged fragmentary detail view of the cartridge type heater shown in section.

Figure 1:
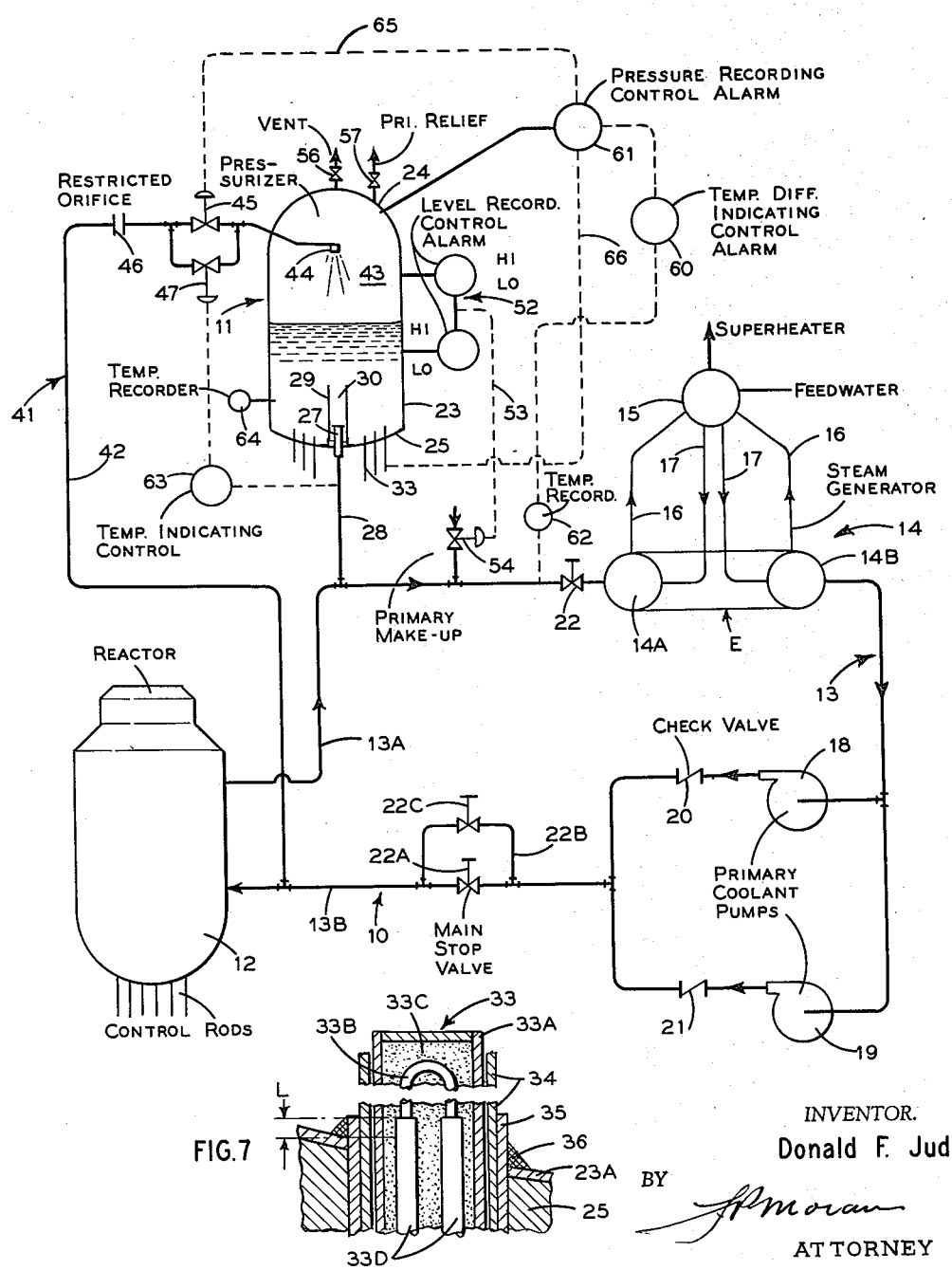
FIG. 1 is a schematic flow diagram of the nuclear vapor generating apparatus illustrating diagrammatically the relative position of the various components thereof with respect to one another.

Referring to FIG. 1, the nuclear vapor generating apparatus in accordance with this invention includes one or more primary coolant systems 10 connected in parallel, and a pressurizer system 11. The primary coolant system 10, of which only one is illustrated, includes a pressurized, light-water, reactor 12, of the type disclosed in abandoned co-pending U.S. applications of Melvin F. Sankovich, S.N. 712,512, filed January 31, 1958 and John F. Mumm, S.N. 721,404, filed March 14, 1958, and a connected loop or heat transport system 13 which circulates primary coolant between the reactor vessel 12 and boiler means 14 at a design flow rate of 128,000 g.p.m. The loop 13 includes a hot outlet leg portion 13A and a cold inlet leg portion 13B connected in communication with the reactor 12. Included within the loop between the inlet and outlet portions 13A, 13B thereof is a U-shaped heat exchanger "E" and associated boiler drum 15, the associated heat exchanger and drum being of the type disclosed in British Patent No. 775,156, dated April 21, 1955. Generally, the hot outlet leg portion 13A of the loop 13 connects the inlet end 14A of the tube and shell heat exchanger E and the outlet end 14B of the heat exchanger connects with the inlet leg portion 13B of the loop. The shell side of the heat exchanger "E" connects to a straight upper steam separating drum 15 by means of riser 16 and downcomer tubes 17 which are capable of creating a natural circulation of the secondary water-steam mixture. Suitable devices (not shown) are provided in the upper drum to supply dry saturated steam at the outlet connections thereof.

A pair of pumps 18 and 19 and associated check valves 20, 21 are connected in parallel within the loop 13 on the downflow side of the heat exchanger E to circulate the coolant through the loop. The check valves 20, 21 are installed downstream of each pump to prevent gross recirculation of water or coolant in case only one pump is operating. In the event of a boiler tube failure check valves 20, 21 prevent excessive loss of water from the reactor while the slow acting gate valves 22, 22A are closing to isolate loop 13. To permit natural circulation through the loop, the check valves 20, 21 allow a small forward flow with the disc of the valve in the vertical position. To provide for warming up a cold loop, the check valves permit a reverse flow with the disc in the vertical position. A small ⅛ inch hole (not shown) in the body or disc of the valve permits a small reverse flow to keep the idle section of piping near operating temperature when only one pump in the loop is running.

Two motor operated gate valves 22, 22A are provided in the loop 13 to isolate the boiler means 14, pumps 18, 19 and check valves 20, 21 of the loop from the reactor 12 and the other loops (not shown) in the event of a leak. Valves 22, 22A normally operate full open or full close, providing no flow control. The valve 22 located in the reactor outlet piping is designed to close in 30 seconds to permit rapid isolation of the loop. The other gate valve 22A located in the reactor inlet piping is designed to open in 4 minutes to minimize the rate of cold water flow into the reactor following accidental opening of the valve with the idle loop cold and pumps operating.

As shown, the valve 22A on the reactor inlet piping 13B is equipped with a by-pass line 22B and a blow down valve 22C for equalizing pressure in the idle loop during start up and for limited flow through the loop on gradual warm-up. Normal closing pressure differentials on the valves are 175 p.s.i.; however the valves are capable of closing with emergency pressure differentials of 1800 p.s.i.

The primary coolant system piping is type 304 stainless steel, predominantly 24 inches O.D. with short sections of 18 inch O.D. for parallel circuits. Normally the coolant system is designed to operate at 1500 p.s.i.a. with an average coolant temperature of 495° F. and a design heat transfer rate of 1.7 billion B.t.u. per hour.

The pressurizer system 11 to be described is to establish and maintain the primary coolant system pressure within the predetermined pressure limits during warm-up, steady state operation, load changes and shut-down; to make up heat lost and to restore temperature when the cooler insurge coolant water mixes with the water (ballast water) already in the pressurizer, and to temporarily contain an insurge of the primary coolant or to provide make-up for the primary system as the density of the coolant decreases and increases respectively. The pressurizer system 11 includes a vertically elongated cylindrical vessel 23 having curvilinear upper and lower head end portions, the vessel normally being adapted to contain a body of saturated liquid in the bottom portion and saturated steam in the upper portion thereof. As shown the vessel is formed of carbon steel; SA 302, Grade B in which the interior thereof is provided with a cladded layer 23A of stainless steel; SA 240, Grade S and SA 298 and thermal sleeve connections are utilized in all the fittings. As illustrated the upper head 24 is hemispherical and the bottom head 25 ellipsoidal in shape. Utilizing an ellipsoidal head 25 in the bottom end has been found to be advantageous in that the overall height of the vessel may be reduced. This consideration becomes important where limitations in space are critical.

Disposed centrally of the bottom head 25 in a thermal sleeve connection 26 is a combined insurge and outsurge nozzle 27. A surge line 28 (FIG. 1) connects the nozzle 26 in communication with the hot leg portion 13A of the primary loop on the upstream side of the gate valve 22. Thus the surge line 28 carries water between the primary coolant system and the pressurizer system when there is a change in the primary coolant water volume.

Centered about the nozzle 26 is a baffle means 29 which forms a chamber 30 for normally containing the insurge of the coolant as it decreases in density and increases in volume during operation as will be hereinafter described. As shown the baffle means 29 comprises a cylinder open at both ends and is supported in spaced relationship to the bottom head by a plurality of brackets 31. Thus openings 32 are provided adjacent the bottom of the chamber 30 to provide means whereby the water may drain from the heater area in the event of a violent outsurge. If desired the baffle means may be arranged to form an inverted conical chamber or the like.

According to this invention a plurality of heater means project upwardly through the bottom head 25 and extend into the lower portion of the vessel. In the illustrated form elongated, cartridge type electrical heaters 33 disposed in pressure sealed wells 34 are utilized. Referring to FIG. 2 and 5 it will be noted that the heater installations include a stainless steel sleeve 35 fitted in a bore in the bottom head and is welded at its inner end to the cladded surface 23A of the vessel as shown at 36 in FIG. 5. The stainless steel heater well 34 sealed at its inner end is fitted through the sleeve 35 and is welded to the sleeve at the outer end thereof at 37. A seal body 38 having exterior threads 39 is welded to the exterior end of the well 34. A cartridge heater 33 having a nut 40 welded thereto, as shown in FIG. 5, is readily positioned in place by threading the nut 40 to the seal body 38. With this arrangement each cartridge heater 33 is rendered readily removable, and with the wells being absolutely pressure and fluid tight, the respective heaters 33 may be removed or replaced with the pressurizing system under pressure. In the event of failure of any heater well, the seal at the outer end of the well is designed to prevent the heater from being blown out and to prevent leakage of the 650° F. water at 1800 p.s.i. present in the vessel 23.

Referring to FIG. 7, the heater 33 includes a cartridge casing 33A enclosing a heating element 33B packed in MgO 33c, the element 33B being connected to a suitable source of electrical energy (not shown). The lower end portion 33D of the heating element is formed so as to have a very low resistance so that that portion thereof will not heat up to any great extent, if at all. Thus it will be noted that with this arrangement a length "L" of the heater, i.e. about 4 inches thereof, in the vicinity adjacent the interior surface of the vessel remains unheated. This unheated length is for the purpose of reducing the amount of heat which would otherwise be imparted to the impurities (crud) that would tend to accumulate in the crevices between the heater wells and vessel wall. Any heat imparted to such "crud" accumulations, it is believed, would tend to aggravate or accelerate the corrosive tendency thereof. Thus with an unheated cartridge length in the vicinity of the "crud" area, the corrosive characteristic of the "crud" is maintained to a minimum and the useful, trouble free life of the vessel is thereby increased accordingly.

In all, 198 heaters, as described, are installed and are controlled by a pressure sensing device, as will be hereinafter described.

A spray means 41 (FIG. 1) is provided to pass a quantity of water for retarding pressure rise on insurge during normal operation of the pressurizer system and for reducing pressure when shutting down. The spray means includes a spray line 42 having one end in communication to the cold inlet leg 13B of the primary coolant system and the other end thereof penetrating into the steam space 43 of the vessel, a spray head 44 being connected at the end thereof. The spray head has a full cone spray pattern with a spray angle of 30° and is installed so that its discharge does not strike the vessel walls when the water level is at the top of the heater wells 34. A control valve 45 is disposed in the line and is rendered operative in response to the pressure within the vessel through the medium of a pressure sensing means to be described. The control of the valve may be such that the flow therethrough may be either continuous or intermittent. In the illustrated form the control valve 45 is intermittently actuated. In the event the control valve sticks in the open position a restricted orifice 46 is positioned in the line to limit the spray line flow.

According to this invention a second valve 47 is disposed in parallel with the control valve 45 and forms a bypass about the control valve 45. The purpose of this bypass valve 47 is to allow a small amount of circulation to be maintained in the spray and surge lines to prevent the development of a cold leg which upon entering the surge line causes thermal shock. To insure the proper amount of anti-shocking circulation, the second valve 47 is controlled by a temperature indicating control 63 which renders the valve 47 responsive to the temperature of the surge line.

Access into the pressurizer vessel is afforded by a single manway opening 48 disposed in the upper head 24. As shown in FIGS. 2 and 6, the manway is provided with a closure 49 that is bolted and a seal welded diaphragm gasket 59 both being provided to insure a pressure and fluid tight seal. As shown in FIG. 2, the entire pressure vessel together with the connected pipings is bottom supported by a depending skirt 51.

The operation of the System in the arrangement above described is as follows:

The pressurizer system in accordance with this invention has a pressure design condition 1800 p.s.i.a. and a design temperature condition of 650° F.; its normal operating pressure and temperature condition being 1500 p.s.i.a. and 596° F.

The water level in the pressurizer vessel 23 is maintained by adjusting the flow of net blow down and make-up liquid to the primary loop 13. A pressurizer level controller means 52 is provided to supply a pneumatic signal through line 53 for actuating a primary make-up valve 54 which proportions the desired amount of make-up water to the primary loop 13 accordingly. On warm-up the pressurizer level control means 52 is adjusted to maintain a minimum water level sufficient to cover the heater wells 34. When this level is reached, all the heaters 33 are turned on. The pressure vessel vent valves 56 and pilot actuated relief valves 57 are open at this point to flush air from vessel 23 and are left open for a period of time until after the water in the pressurizer starts boiling at which time the valves 56, 57 are shut off. Connections for the vent and relief valves are shown at 58, 59 respectively; in FIG. 2 and FIG. 4. The vessel 23 is then brought up to a pressure of 145 p.s.i.g. through a programmed manual adjustment of a temperature differential indicating control alarm 60, which functions in conjunction with a pressure sensing device 61 and with a temperature recorder means 62 installed in the outlet leg 13A of the primary loop system. The TDICA means 60 is required to maintain System pressure at a safe point above the saturation temperature of the primary coolant system during warm-up and shut down. The pressure sensing device 61 in the form of a pressure recorder controller alarm, regulates the heaters during normal operation and warm-up and the control valve 45 in the spray line during cool-down.

Pressure of 145 p.s.i.g. is held until the primary system 10 is heated to 218° F., after which the control 60 is set to automatically maintain a temperature differential of 146° F. until operating pressure and temperature have been reached. This controls the pressure of the pressurizer system by regulation of the heater inputs.

When 145 p.s.i.g. System pressure is reached, the water level in the vessel is gradually increased by manual regulation of the water level controls 52 according to a predetermined program until operating level is reached at which point the control of water level becomes automatic. When normal operating conditions of pressure and temperatures have been reached, the control function of the temperature differential indicator control 60 is manually switched off and the responsibility for maintaining the System pressure is turned over to the pressure recording means 61 which is responsive to the pressure within the vessel 23. From this point on, the pressurizer system will regulate itself, as it will be noted that the pressure sensing control means 61 co-ordinates the operation of the spray control valve 45 and heaters 33 as indicated by the signal lines 65, 66 in FIG. 1.

The heaters 33 are connected to a power source in multiples of 6, each group of 6 heaters to perform a balanced 3-phase load operating on a 480 v. source. In operation the heaters are controlled by a pressure sensing device 61 which is responsive to the System's pressure and are operated in five (5) banks according to the following schedule:

| Pressure Range, p.s.i.a. | Heaters Switched On | | Total Heaters On | |
| --- | --- | --- | --- | --- |
| | No. | Kw. | No. | Kw. |
| 1,500 and above | None | None | None | None |
| 1,490–1,500 | 12 | 25.2 | 12 | 25.2 |
| 1,480–1,490 | 12 | 25.2 | 24 | 50.4 |
| 1,470–1,480 | 36 | 75.6 | 60 | 126.0 |
| 1,460–1,470 | 60 | 126.0 | 120 | 252.0 |
| Below 1,460 | 78 | 163.8 | 198 | 415.8 |

The first two banks of 25.2 kw. heaters are provided with a continuously variable type of control such as saturable reactor control. All other heaters can be switched on in complete banks.

The pressurizer heater load is distributed on the available power sources so that part of the heaters are available under any circumstances.

On shut-down all the heaters are manually shut off. The control function of the temperature differential indicator alarm control 60 is cut back into the control circuit, the temperature differential of 146° F. being already set as it is the same value as used in the automatic phase of warm-up. The pressure is lowered automatically by spraying into the steam space 43 in accordance to the temperature differential controller 60 until the reactor outlet temperature reaches 260° F. At this point the pressure will be 250 p.s.i.g. The control function of the temperature differential controller 55 is then cut out and the pressure lowered from 250 p.s.i.g. to 150 p.s.i.g. by manual control of the spray control valve 45. The pressure is held at 150 p.s.i.g. until the reactor outlet temperature reaches 180° F. at which time the System shall be vented to atmospheric pressure at a manually controlled rate; and all System controls cut off when atmospheric pressure is reached.

During normal operation any surge in the described arrangement is followed by an equal surge in the opposite direction as the controls seek to restore level. The pressurizer system is designed to accommodate maximum normal insurges of thirty (30) cubic feet of 510F water over a period of three (3) minutes at a maximum rate of seventeen (17) cubic feet per minute. The System contains this insurge and maintains pressure below 1650 p.s.i.a. with the benefit of maximum spray into the steam space without the benefit of any increase in net blow-down from the primary system 10.

The designed maximum normal outsurge of the System is thirty (30) cubic feet of 596F water over a period of 3 minutes at a maximum rate of seventeen (17) cubic feet per minute. With this thirty (30) cubic feet outsurge, the System is designed to maintain the pressure above 1400 p.s.i.a. without benefit from an increase in net make-up to the primary system.

In the event the water level drops below a minimum point the heaters are automatically cut off, and the automatic level control is cut off when the water level drops below the top of the heater walls. In this case the level is restored manually at a rate which will reduce the chances of shocking the heater walls and pressurizer walls.

To minimize the possibility of shocking the surge line on either insurge or outsurge, a small flow is maintained in the spray line and surge line. The flow therethrough is such that the temperature in the surge line, midway between the primary piping and the pressurizer is maintained at approximately 553° F. A temperature indication control 63 controls the flow so as to maintain the desired surge line temperature.

Other desired instrumentation includes a temperature recorder 64 for measuring the temperature of the ballast water in the pressurizer. The instrumentation herein referred to may be of any of the known type common to the art, as e.g. the Bailey Meter Company's pressure and/or temperature sensing devices.

In accordance with this invention it is to be noted that the physical arrangement of the pressurizer components herein described has definite features and advantages. Of prime importance is that of the vertically mounted heater arrangement in the bottom of the vessel 23. This arrangement facilitates the removal of accumulations of impurities which are rendered radioactive, due to the nature of the apparatus. According to this invention cleaning of the vessel is accomplished by a high pressure lance manipulated from the manway 48 at the top of the vessel, the lance directing a jet of water in the spaces around the vertical heaters to flush out the deposits of impurities. The further advantage to be gained by this method of cleaning is that the inside surface of the bottom head may be cleaned with the pressurizer vessel filled with water thus providing a very good shield for the operator using the cleaning lance.

Also by positioning the heaters in the bottom of the vessel a minimum water volume is required for maintaining the heaters submerged and therefore the overall height of the vessel may be reduced with resulting savings in initial cost thereof.

An elliptical head is particularly desirable at the bottom of the vessel and is particularly suited for the vertically mounted heaters in that the outermost circle of heaters do not have to penetrate as much metal as the same diameter circle penetrating the hemispherical head. Also the elliptical head reduces the overall length of the vessel. Further the greater approximation to a flat plate of the elliptical head renders possible the mounting of more heaters than would be otherwise possible with a hemispherical head.

The chamber formed by the baffle means 29 has particular utility in that during normal operation the insurging fluid is contained within the chamber 30. This minimizes the mixing of the relative cool insurging water with the hot ballast water. As a result the generation of steam is not materially effected by the cooler insurging water and the heater input on insurge is not materially increased. Consequently the conditions within the vessel on insurge and outsurge are such that the response of pressure sensing device to the internal pressure of the vessel is rendered more instantaneous than would otherwise be the case if the insurge was allowed to cool the ballast water in mixing therewith. The baffle chamber confining the insurge water also reduces thermal shock on the heater well and bottom head.

While the instant invention has been disclosed with reference to a particular embodiment thereof, it is to be appreciated that the invention is not to be taken as limited to all of the details thereof as modifications and variations thereof may be made without departing from the spirit or scope of the invention.

What is claimed is:

1. A pressurizer comprising a vertically elongated vessel having an upper head and a lower head, said vessel having a liquid level dividing it into a liquid space and a vapor space, means forming a surge inlet and outlet in the lower head of said vessel below said liquid level, a plurality of heaters projecting upwardly through said lower head and disposed below said liquid level, and a spray nozzle positioned within said vessel in the vapor space thereof, said means forming a surge inlet and outlet having its upper end disposed above the upper ends of said heaters so that mixing of the relatively cool insurging liquid occurs above said heaters thereby minimizing the thermal shocking of said heaters.

2. A pressurizer according to claim 1 wherein each of said heaters has a relatively unheated portion in the vicinity immediately above the inside surface of said lower head.

3. A pressurizer comprising a vertically elongated cylindrically shaped pressure vessel adapted to contain a body of liquid having a liquid level separating said vessel into a liquid space and a vapor space, said vessel having a curvilinear bottom head end portion, means forming a combined surge inlet and surge outlet in said bottom head portion, a plurality of heaters projecting vertically upwardly through said bottom end and into said liquid space, said combined surge inlet and outlet having its upper end disposed above the upper ends of said heaters so that mixing of the relatively cool insurging fluid occurs above said heaters and thereby minimizes the thermal shocking of said heaters, and a spray nozzle positioned in the vapor space of said vessel.

4. A pressurizer for use in a nuclear generator comprising a vertically elongated vessel having an upper head end and an ellipsoidal lower head end, said vessel adapted to contain in operation a body of saturated liquid having a liquid level separating said vessel into a liquid space and a vapor space, a combined inlet and outlet surge means disposed in the lower head, a plurality of heaters extending upwardly through the lower head end and into said liquid space, said combined inlet and outlet surge means disposed to discharge the relatively cool insurging fluid above the heaters, and a manway disposed in said upper head to provide access into said vessel to facilitate cleaning the bottom thereof with said liquid level providing a radiation shield during cleaning.

5. A pressurizer for use in a nuclear generator comprising a vertically elongated vessel having an upper head end and an ellipsoidal lower head end, said vessel adapted to contain in operation a body of saturated liquid having a liquid level separating said vessel into a liquid space and a vapor space, a combined inlet and outlet surge means disposed in the lower head, a plurality of heaters extending upwardly through the lower head end and into said liquid space, a baffle means forming a chamber extending about said surge means and beyond the upper ends of said heater for normally containing relatively cold insurging fluid away from said heaters to minimize thermal shocking of said heaters and a manway disposed in said upper head to provide access into said vessel for cleaning the bottom thereof with said liquid level providing a radiation shield during cleaning.

6. A pressurizer comprising a vertically elongated vessel having an upper and a lower head end portion, a surge inlet and outlet nozzle projecting upwardly through the lower head end, a plurality of heaters projecting upwardly through the lower head end and disposed about said nozzle, a baffle circumscribing said nozzle to form an open end chamber about said nozzle for containing the relatively cool insurging fluid out of contact with said heaters disposed thereabout, the open end of said chamber being disposed above the upper ends of said heaters so that mixing of the relatively cool insurging fluid occurs above the heater and thereby minimizes thermal shocking of the heaters, and a spray nozzle positioned in the upper portion of said vessel.

7. A pressurizer comprising an elongated pressure vessel adapted to contain a body of liquid having a liquid level separating said vessel into a liquid space and a vapor space, means forming a combined surge inlet and surge outlet in the bottom of the vessel, a plurality of heaters projecting through the vessel and into the liquid space, said combined surge inlet and outlet forming means having its upper end disposed above the heaters so that mixing of the relatively cool insurging fluid occurs above said heaters and thereby minimizes the thermal shocking of said heaters, and a spray nozzle positioned in the vapor space of said vessel.

8. A pressurizer according to claim 6 wherein said heaters are grouped and electrically connected in multiples to form a plurality of heater banks, said banks being electrically connected for sequential operation in succeeding and cumulative order as the pressure in the vessel progressively decreases and in receding order as the pressure progressively increases, and said spray nozzle being operative to reduce excessive build-up and pressure within the vessel, means for coordinating the actuation of said heater banks, and spray means for maintaining pressure within the vessel within predetermined units.

9. A pressurizer according to claim 8 wherein the number of said heaters operative in each succeeding bank being greater in number than that in the preceding bank.

References Cited in the file of this patent
UNITED STATES PATENTS

| | | |
|---|---|---|
| 1,918,414 | McNey | July 18, 1933 |
| 2,258,744 | Rosiers | Oct. 14, 1941 |
| 2,457,658 | Graham | Dec. 28, 1948 |
| 2,515,835 | Preston | July 18, 1950 |
| 2,708,656 | Fermi et al. | May 17, 1955 |
| 2,796,368 | Creutz et al. | July 18, 1957 |

OTHER REFERENCES

Simpson et al., "International Conference on the Peaceful Uses of Atomic Energy," vol. 3, pp. 211–226, August 1955, UN Publication, N.Y. (Copy in Scientific Library.)